(12) United States Patent
Monk

(10) Patent No.: US 9,495,236 B2
(45) Date of Patent: Nov. 15, 2016

(54) INTUITIVE VISUAL ASSESSMENT OF DEVICE OPERATIONAL HEALTH

(71) Applicant: Cubic Corporation, San Diego, CA (US)

(72) Inventor: Paul Monk, Surrey (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/680,560

(22) Filed: Apr. 7, 2015

(65) Prior Publication Data

US 2015/0286515 A1 Oct. 8, 2015

Related U.S. Application Data

(60) Provisional application No. 61/976,419, filed on Apr. 7, 2014.

(51) Int. Cl.
| | | |
|---|---|---|
| *G06F 11/00* | (2006.01) | |
| *G06F 11/07* | (2006.01) | |
| *G06T 19/00* | (2011.01) | |
| *G06F 11/30* | (2006.01) | |
| *G06Q 10/10* | (2012.01) | |
| *G06T 11/60* | (2006.01) | |
| *G06F 3/01* | (2006.01) | |

(52) U.S. Cl.
CPC ............ *G06F 11/079* (2013.01); *G06F 3/011* (2013.01); *G06F 11/0709* (2013.01); *G06F 11/0751* (2013.01); *G06F 11/0772* (2013.01); *G06F 11/3055* (2013.01); *G06Q 10/10* (2013.01); *G06T 11/60* (2013.01); *G06T 19/006* (2013.01)

(58) Field of Classification Search
CPC .................................................. G06F 11/3055
See application file for complete search history.

(56) References Cited

U.S. PATENT DOCUMENTS

| | | | |
|---|---|---|---|
| 5,886,683 A | 3/1999 | Tognazzini et al. | |
| 5,953,055 A | 9/1999 | Huang et al. | |
| 8,315,909 B1 | 11/2012 | Barker | |
| 2002/0049567 A1* | 4/2002 | Vataja | G07C 3/00 702/188 |
| 2002/0153417 A1 | 10/2002 | Imazuka | |
| 2007/0100677 A1 | 5/2007 | Boss et al. | |
| 2007/0265935 A1 | 11/2007 | Woycik et al. | |
| 2011/0078637 A1 | 3/2011 | Inderrieden et al. | |
| 2011/0166884 A1 | 7/2011 | Lesselroth et al. | |
| 2011/0276695 A1 | 11/2011 | Maldaner | |
| 2012/0047233 A1* | 2/2012 | Jin | G06T 11/00 709/219 |
| 2012/0281094 A1 | 11/2012 | Forshaw | |

(Continued)

FOREIGN PATENT DOCUMENTS

WO 2013/153740 A2 10/2013

OTHER PUBLICATIONS

International Search Report and Written Opinion for PCT/US2015/024737 mailed on Aug. 13, 2015, 114 pages.

(Continued)

*Primary Examiner* — Philip Guyton
(74) *Attorney, Agent, or Firm* — Kilpatrick Townsend & Stockton LLP

(57) ABSTRACT

Among other things, an augmented reality device that is configured and/or arranged to present particular device operational health information as a function of the distance between the augmented reality device and the particular device.

20 Claims, 10 Drawing Sheets

(56) References Cited

U.S. PATENT DOCUMENTS

2013/0031202 A1 1/2013 Mick et al.
2013/0120449 A1* 5/2013 Ihara .................. G06F 11/0727
345/633

OTHER PUBLICATIONS

Julier, S., et al., "Information Filtering for Mobile Augmented Reality", Augmented Reality, 2000. (ISAR 2000). Proceedings. IEEE and ACM International Symposium on Munich, Germany, Oct. 5-6, 2000, Piscataway, New Jersey, USA, IEEE. Oct. 5, 2000, XP010520304, DOI: 10.1109/ISAR.2000.880917, ISBN: 978-0-7695-0846-7. pp. 3-11.

Keil, Jens, et al., "Controlling and Filtering Information Density with Spatial Interaction Techniques via Handheld Augmented Reality", Virtual Augmented and Mixed Reality. Designing and Developing Augmented and Virtual Environments, Springer Berlin Heidelberg, Berlin Heidelberg, Jul. 21, 2013. XP047031869, ISBN: 978-3-642-39404-1, pp. 49-57.

U.S. Appl. No. 14/680,557, filed Apr. 7, 2015, First Action Interview Pilot Program Pre-Interview Communication mailed Jul. 22, 2015, all pages.

U.S. Appl. No. 14/680,571, filed Apr. 7, 2015, First Action Interview Pilot Program Pre-Interview Communication mailed Aug. 18, 2015, all pages.

* cited by examiner

INTUITIVE VISUAL ASSESSMENT OF DEVICE OPERATIONAL HEALTH

CROSS-REFERENCE TO RELATED APPLICATION

This application claims the benefit of U.S. Prov. Pat. App. Ser. No. 61/976,419, filed 7 Apr. 2014, the entirety of which is hereby incorporated by reference for all intents and purposes.

SUMMARY

Although the present disclosure is not so limited, a method may include or comprise sending, by an AR (Augmented Reality) device to a transit system server, a request for access to operational health data associated with at least one device of the transit system; receiving, by the AR device from the transit system server, operational health data associated with the at least one device of the transit system; and outputting, by the AR device for display thereby, operational health data associated with the at least one device of the transit system in a detail that is a function of a distance between the AR device and the least one device of the transit system.

Although the present disclosure is not so limited, a server system may include or comprise: at least one processor; at least one wireless network interface; and at least one non-transitory memory element communicatively coupled with and readable by the at least one processor, and having stored therein processor-readable instructions that when executed by the at least one processor cause the at least one processor to: detect a request for access to operational health data associated with at least one computing device; access a database to acquire operational health data associated with the at least one computing device; and generate a command to transmit via the at least one wireless network interface the operational health data associated with the at least one computing device to an AR (Augmented Reality) device for display thereby in a detail that is a function of a distance between the AR device and the least one computing device.

Although the present disclosure is not so limited, a method may include or comprise: sending, by a wearable AR (Augmented Reality) device to a transit system server, a request for access to operational health data associated with a ticket vending machine of the transit system; receiving, by the AR device from the transit system server, operational health data associated with the ticket vending machine; and rendering, by the AR device in response to a command, operational health data associated with the ticket vending machine in a detail that is a function of a distance between the AR device and the ticket vending machine; wherein the operational health data associated with the ticket vending machine is rendered as an abbreviated summary to convey high-level operational status of the ticket vending machine when the distance between the AR device and the ticket vending machine is greater than a predetermined threshold distance, and wherein the operational health data associated with the ticket vending machine is rendered as an unabbreviated summary to convey in greater detail than the abbreviated summary operational status of ticket vending machine when the distance between the AR device and the ticket vending machine is less than or equal to the predetermined threshold distance.

DETAILED DESCRIPTION

The present disclosure is directed to or towards systems and methods that enable personnel to quickly and intuitively determine the operational health of particular equipment or devices. The term or phrase "operational health," and variants thereof, in the context of the present disclosure is diagnostic-related and may refer to the instant overall status of any particular piece of equipment or device, such as "offline" or "online," and/or the instant status of at least one particular component of any particular piece of equipment or device, such as a bill or paper money loader of a computing device that is "jammed" or "operational."

It is contemplated that the features or aspects of the present disclosure may be applicable in or to many different scenarios. For instance, consider a transit or transportation system scenario or implementation, by utilizing augmented reality as contemplated herein to present the status of internal components and subsystems of a TVM (Ticket Vending Machine), for example, while the TVM is within a field-of-view of a wearable augmented reality device, an operator may glance around an environment and in an intuitive manner quickly come to an understanding of the operational health or status of the TVM. An example of such an implementation might include displaying, by an OHMD (Optical Head-Mounted Display), the fill levels of cash vaults within a particular TVM, while the particular TVM is within a field-of-view of the OHMD, so that an operator may be able to quickly determine that the fill levels of cash vaults of the TVM is or are low or depleted. It is contemplated that by displaying or rendering device status in this manner, an operator may observe trends and potentially predict and prevent operational problems before they occur. Additionally, it is contemplated that instructions may be displayed rendered to enable the operator to quickly mitigate any issue or problem. For example, if a particular TVM is determined to have an empty ticket roll, a list with or of instructions may be displayed by the OHMD to enable the operator to follow the instructions to address the empty ticket roll issue. Although not so limited, an appreciation of the various aspects of the present disclosure may be gained from the following discussion in connection with the drawings.

Figure 1:
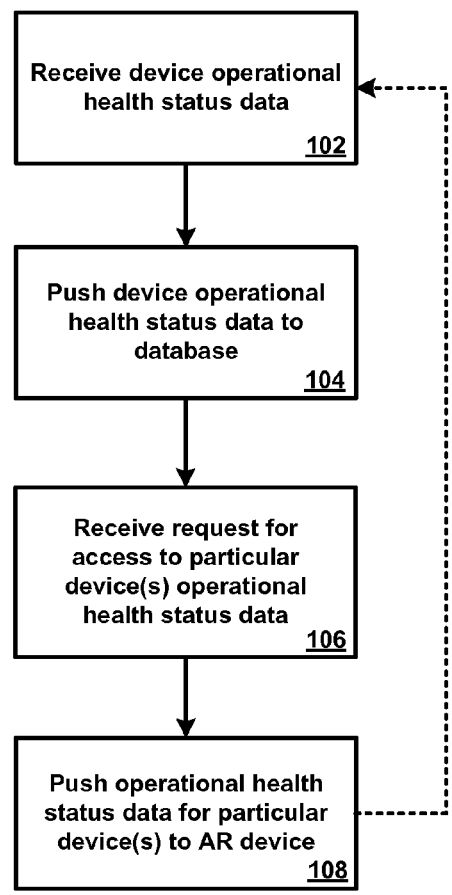
FIG. 1 shows an example method according to the disclosure.

For instance, referring now to FIG. 1, an example method 100 is shown in accordance with the principles of the present disclosure. It is contemplated that aspects of the method 100 may be implemented wholly or at least partially by a server device(s) configured and/or arranged to enable personnel to quickly and intuitively determine the operational health of equipment or devices, without experiencing information overload. An example of such a server device is discussed in further detail below in connection with at least FIG. 3 and FIG. 10. The example steps of the method 100 may be performed in any order, sequentially or in parallel, as needed or desired, possibly based on implementation-specific details.

At step 102, the server device may receive, from a particular computing device over a wireless communication link, data that describes an instant operational health status of the particular computing device. For example, the server device may receive a transmission from the particular computing device that includes the data "Timestamp: 13:44; 3/28/15" and the data "Status: Online; Fully Operational" as data that describes an instant operational health of the particular computing device. As another example, the server device may receive a transmission from the particular computing device that includes the data "Timestamp: 13:44; 3/28/15" and the data "Status: Online; Cash Fill Level Below Threshold or Depleted" as data that describes an instant operational health of the particular computing device. As yet another example, the server device may receive a transmission from the particular computing device that includes the data "Timestamp: 13:44; 3/28/15" and the data "Status: Offline; Empty Ticket Roll" as data that describes an instant operational health of the particular computing device. Still many other examples are possible, and the type or form of the data that describes an instant operational health of the particular computing device in general may be a function of the type or form of the particular computing device or equipment itself. For example, if the particular computing device is incorporated into an automobile that is parked in a parking lot at an automobile dealership, the data that describes an instant operational health of the automobile might include "Timestamp: 13:44; 3/28/15" and the data "Status: Low Battery Charge; Left Tire Pressure Below Threshold." Other examples are possible as well, and it will be appreciated that the features or aspects of the present disclosure may be leveraged and applicable in or to many different scenarios.

At step 104, the server device may access a database or datastore and write to a historical log associated with the particular computing device the data received at step 104 that describes an instant operational health of the particular computing device. For example, the server device may via CRUDQ (Create, Read, Update, and Query) operations access the database and append the data "Timestamp: 13:44; 3/28/15" and the data "Status: Online; Fully Operational" to a historical log of operational health status associated with the particular computing device. In general, it is contemplated that entries may periodically or at least intermittently be added to the historical log, indicated in FIG. 1 by the loop or branch between step 102 and step 108. That loop or branch however may originate from any step within the example method 100 back to step 102. Still many other examples are possible, and the historical log need not necessarily only contain data that describes an instant operational health status of the particular computing device. For example, the historical log may be part of a data file of greater extent, such as a data file that describes or details the maintenance history of the particular computing device. Other examples are possible as well.

At step 106, the server device may receive, from a particular wearable augmented reality device, a request for access to operational health status data associated with at least one particular device. For example, the server device may receive a transmission from the particular wearable augmented reality device that includes an image or video of the at least one particular device. Here, it is contemplated that the server device may examine properties or characteristics of the image or video in order to positively identify the at least one particular device, and then query the database or datastore to access up-to-date operational health status, and other data, associated with the at least one particular device. For example, features or elements within the image or video directly associated with the at least one particular device may be identified and utilized to positively identify the at least one particular device. For example, a tag or bar code or the like identified within the image or video that when analyzed may be utilized by the server device to positively identify the at least one particular device. As another example, features or elements within the image or video indirectly associated with the at least one particular device may be utilized to positively identify the at least one particular device. For example, features or elements in the physical vicinity of the at least one particular device that are positively identifiable, such as a landmark or feature of or within a building or transit station (e.g., a particular access control point), may be utilized by the server device to positively identify the at least one particular device. Other examples are possible as well.

At step 108, the server device may transmit, to the particular wearable augmented reality device, the up-to-date operational health status, and other data, associated with the at least one particular device, so that the particular wearable augmented reality device may output for display particular operational health or status information relating to the at least one particular device. In general, and as contemplated throughout, the particular operational health or status information may be selected based upon an estimated or approximated or estimated distance between the wearable augmented reality device itself and the at least one particular device. For example, the server device may transmit to the particular wearable augmented reality device at least the following data: (a) "Timestamp: 13:44; 3/28/15; Device X"; (b) "Device X Status: Offline; Ticket Roll Empty"; (c) "1. Open front cover; 2. Clear mechanism; 3. Replace ticket role; 4, Reset status to: online; 5. Close front cover"; and (d) "Device X GPS Coordinates: 51.5100° N, 0.1344° W." In this example, the particular wearable augmented reality device may output the data (a)-(c) in detail for display if it is determined that that the physical distance between the particular wearable augmented reality device itself and the at least one particular device is less than or equal to a predetermined threshold value, such as two (2) meters for example. Otherwise, only a high-level summary of the data (a)-(c) may be output for display by the particular wearable augmented reality device. In this manner, an operator wearing the particular wearable augmented reality device may only be exposed to the detail of the data (a)-(c) when determined needed or necessary. An example of such an implementation, along with a description of the various benefits and advantages associated with such an implementation, is discussed in further detail below in connection with FIGS. 2-10.

Figure 2:
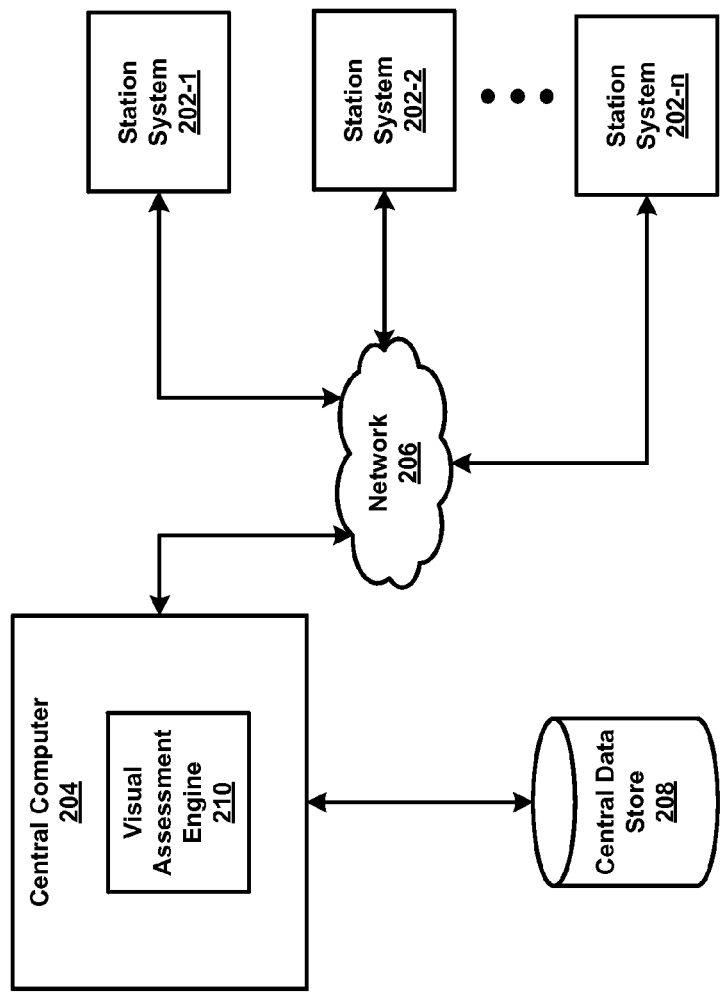
FIG. 2 shows an example computing environment according to the disclosure.

For instance, referring now to FIG. 2, a block diagram of an example transit system 200 is shown in accordance with the principles of the present disclosure. In general, the transit system 200 may provide access to transit services (not shown) to users of the transit system 200, record transactions of the users, collect transit fares, and enable personnel to quickly and intuitively determine the operational health of equipment or devices as discussed in detail below. The transit system 200 may include various forms of transit, such as subway, bus, ferry, commuter rail, para-transit, and so on, or any combination thereof, which may be accessed at stations and/or other locations throughout the transit system 200. As indicated in FIG. 2, the transit system 200 may include or comprise any number of stations, with any number of corresponding station systems 202 (e.g., 202-1, 202-2, . . . , 202-N, where N is an integer value).

Put generally, the functionality of the transit system 200 is as follows. To gain access to transit services, users may present fare media at access control points, which may include a turnstile, fare gate, platform validator, para-transit vehicle, bus, conductor handheld unit, or fare box at an entry, exit, or other location of a transit station. Transactions of a user, such as passage at a transit access control points, may frequently occur at stations of the transit system 200, although it will be understood that access control points may exist elsewhere, such as on busses or trains. Each station system 202 may gather information regarding transactions and communicate, individually, in batches, on a scheduled/periodic basis, on a real-time/near-real-time/delayed basis, etc., the information to a central computer or server 204 via WAN (Wide Area Network) 206.

The WAN 206 may include one or more networks, such as the Internet, that may be public, private, or a combination thereof. The WAN 206 may support packet-switched or circuit-switched connections using telephone lines, coaxial cable, optical fiber, wireless communication, satellite links, and/or other mechanisms for communication. Thus, the usage of fare media such as a transit card (e.g. magnetic, contactless, etc.), an identification card, a bank card, a mobile phone, or other item presented for passage at access control points throughout the transit system 200 may be recorded, monitored, etc., by the central computer 204 and/or stored, along with related data, in a central datastore 208 (e.g., in a database or other data storage structure) for subsequent access thereby. Additionally, the central computer 204 may exhibit an instance of a VAE (Visual Assessment Engine) 210 that which may enable personnel to quickly and intuitively determine the operational health of equipment or devices in accordance with the principles of the present disclosure. In general, the VAE 210 may include or comprise logical modules of hardware, software, firmware, or any combination thereof, and additional or other instances the VAE 210 may be incorporated into the transit system 200 to enable the features of aspects of the present disclosure, discussed in further detail below.

Figure 3:
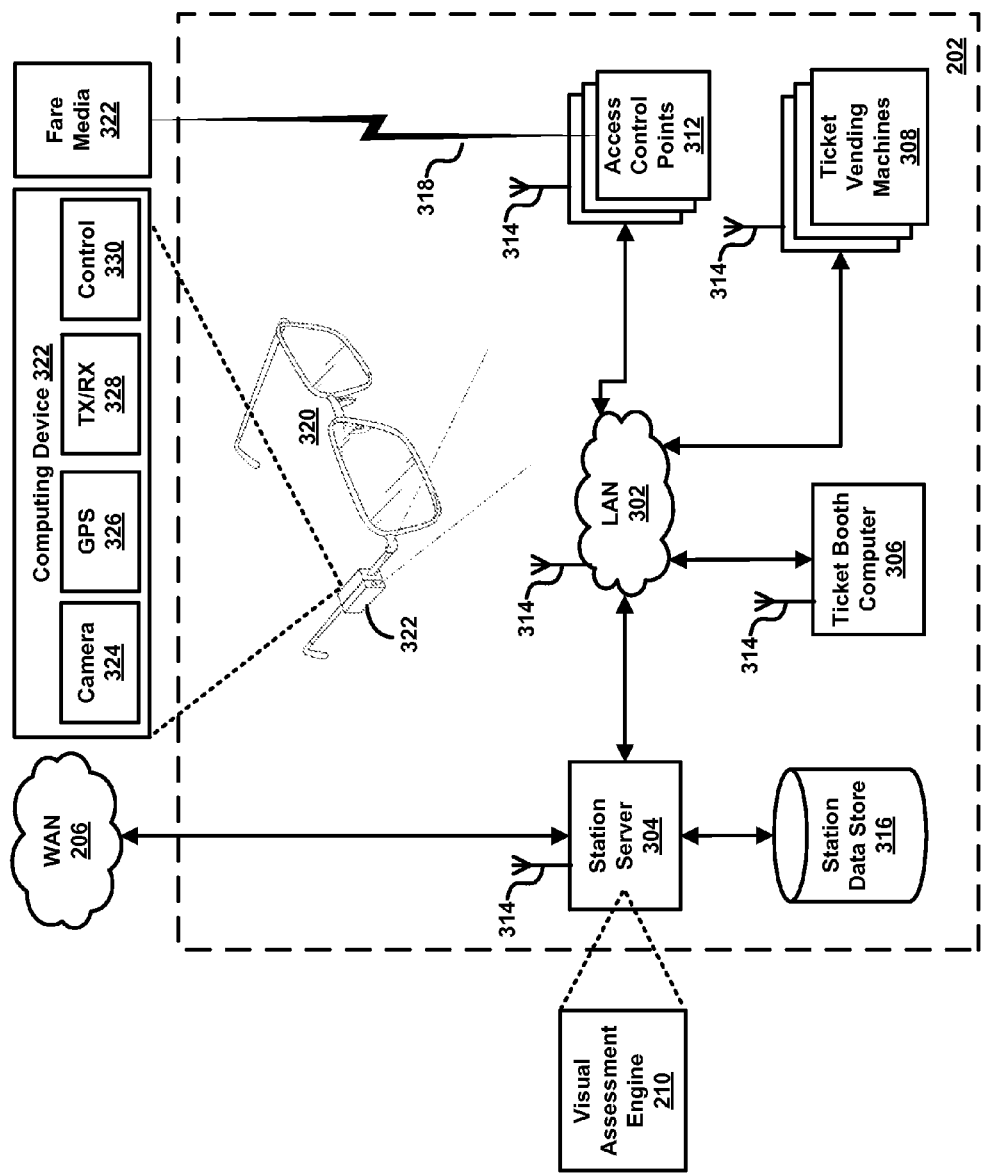
FIG. 3 shows another example computing environment according to the disclosure.

For instance, referring now to FIG. 3, a block diagram of an example station system 202 is shown in accordance with the principles of the present disclosure. As mentioned above, the example transit system 200 of FIG. 2 may include or comprise various forms of transit, such as subway, bus, ferry, commuter rail, para-transit, and more. Because different forms of transit may require different functionality, each instance of a station system 202 may have some or all of the components shown in the block diagram of FIG. 3, whereby a LAN (Local Area Network) 302 communicatively couples the various systems together and could include point-to-point connections, packet-switched connections, wireless connections, and/or other networking techniques.

As shown in FIG. 3, a station server 304 may be coupled to the WAN 206 to enable bi-directional communication between the station server 304 and the central computer 204 (see FIG. 2). Processing of local information may be performed on or by the station server 304. For example, fare information, schedule information, delay update information, and other transit related information may be processed at the station server 304 and communicated to the various other machines or elements in the transit system 200. Additionally, the station server 304 may exhibit an instance of a VAE 210 that which may enable personnel to quickly and intuitively determine the operational health of equipment or devices in accordance with the principles of the present disclosure, discussed in detail below.

Among other functions, a ticket booth computer 306 and each of a plurality of TVMs 308 of the station system 202 as shown in FIG. 3 may be used to create and/or distribute fare media 310, such as magnetic fare cards. Each instance of a TVM 308 may be operated by a transit user and/or remotely operated by a transit employee or operator. The ticket booth computer 306 may be a computer within a ticket booth and utilized by a transit employee or operator to issue an instance of fare media 310, perform fare media verification, and perform other functions. Also shown in FIG. 3 is or are a plurality of access control points 312.

In practice, the ticket booth computer 306, access control points 312, and TVMs 308 may communicate with the central computer 204 through the station server 304 and/or directly with the central computer 204 via the LAN 302 and WAN 206. As previously indicated, access control points 312 may communicate transactional information with the station server 304, which may relay transactional information to the central computer 204. This communication may be transmitted via a physical connection or wireless connection via one or more antennas 314. Furthermore, transactional data and/or related lists may be maintained on a station datastore 316. Other information may be maintained or stored in or on station datastore 316, including data or information accessible by the VAE 210 to enable personnel to quickly and intuitively determine the operational health of equipment or devices in accordance with the principles of the present disclosure, discussed detail below.

Various media may be used as fare media 310 in the transit system 200. For example, a user may utilize an NFC-enabled mobile device to transmit an identification code and/or other information to an access control point 312 for passage at or through the access control point 312. Such a transmission 318 may be wireless, such as by NFC communication. Additionally or alternatively, other media having a unique identification code, readable by access control points 312, may be used. By way of example, but not by limitation, this may include magnetic stripe cards, RFID (Radio-Frequency Identification) tags and/or RFID-tagged items, a smart card, and items having a bar code.

Also shown in FIG. 3 is a WARD (Wearable Augmented Reality Device) 320 that includes a computing system 322 having incorporated therein at least one camera 324, a GPS (Global Positioning System) module 326, a transceiver 328, and a control 330. In some examples, the WARD 320 may be considered "smart glasses" configured and/or arranged to support the display of CGI (Computer Generated Images) superimposed on a real-world view, i.e., augmented or mixed reality. As discussed in further detail below, the WARD 320 together with the VAE 210 may enable personnel to quickly and intuitively determine the operational health of a particular piece of equipment or device in accordance with the principles of the present disclosure. It will be appreciated that the type or form of the particular piece of equipment or device in general is implementation-specific. One example though is a TVM 308 as shown in FIG. 3, and various details associated with a particular instance of a TVM 308 is shown and described in connection with FIGS. 4-5.

Figure 4:
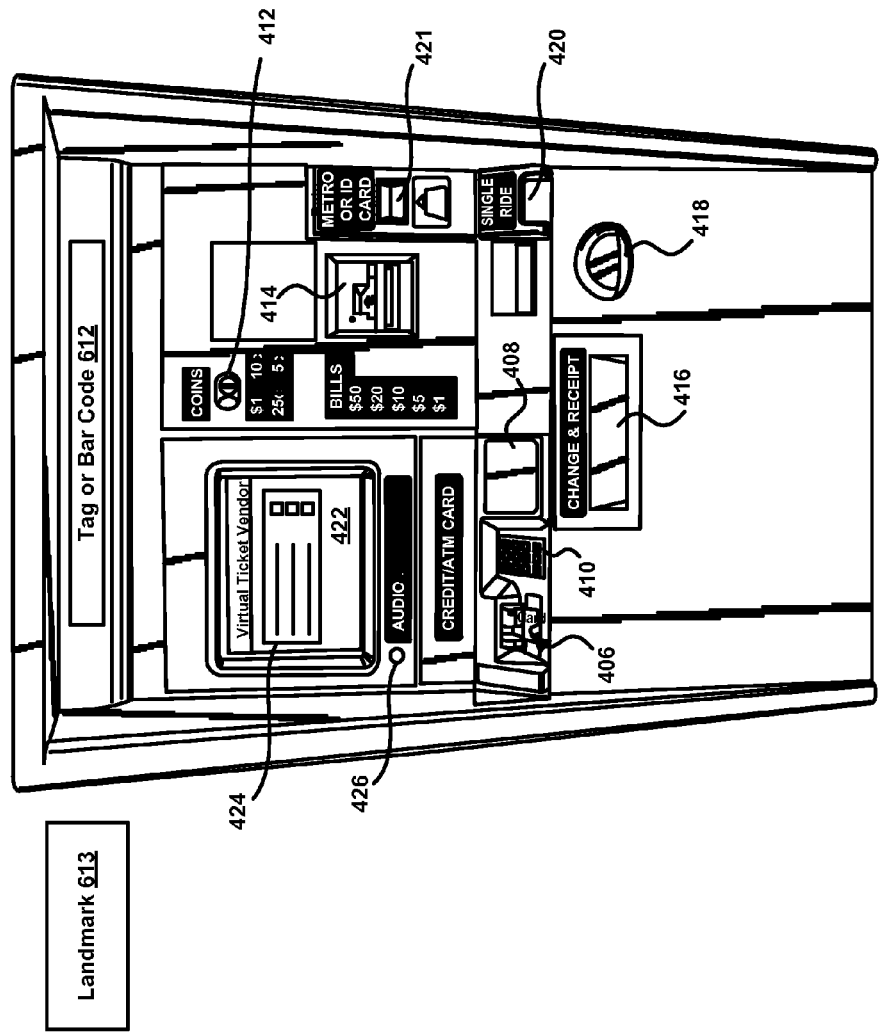
FIG. 4 shows an example transit-related device according to the disclosure.
Figure 5:
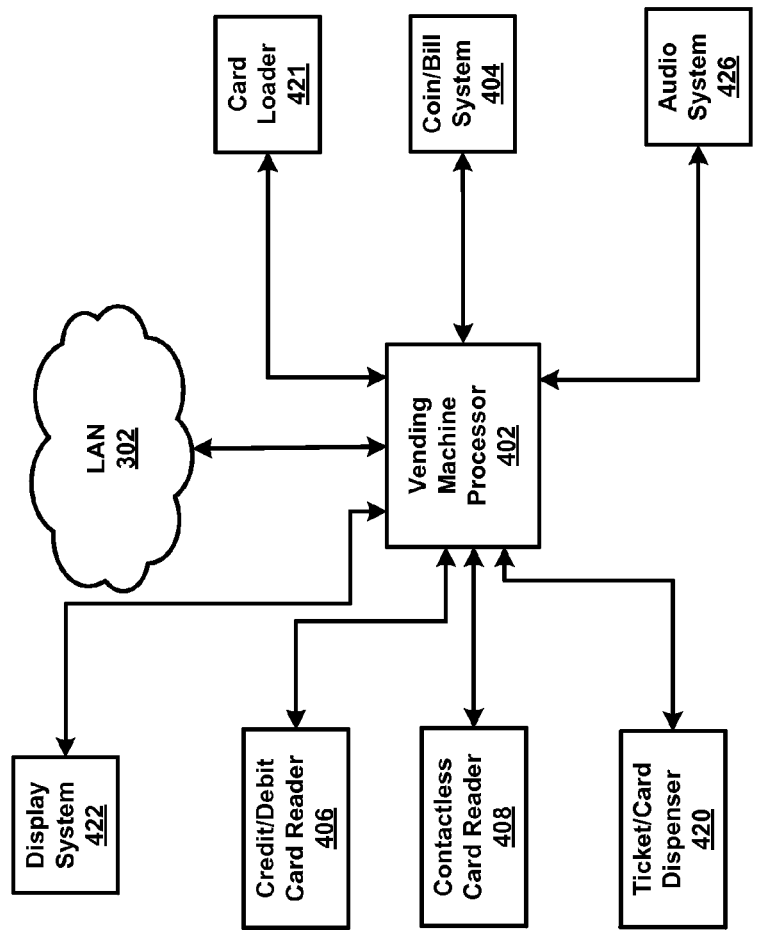
FIG. 5 shows the device of FIG. 4 in block diagram form.

In particular, FIGS. 4-5 show, respectively, a perspective view and block diagram of an example TVM 308. In this example, a vending machine processor 402 is coupled to the other components of the TVM 308 and transmits and receives signals to and from other subsystems to cause the same to perform their intended functions. Reloadable prepaid cards and other fare cards may be purchased and/or reloaded with value at the TVM 308. A coin/bill system 404, credit/debit card reader 406, and contactless card reader 408 are used to make payments for transactions at the TVM 308. A pin pad 410 may be provided adjacent to the credit/debit card reader 406 to enter numerical information such as a PIN code for a debit card. A coin slot 412 and bill loader 414 are used to accept cash. Change is returned in a change/receipt slot 416 and coin return 418. Newly-issued reloadable prepaid cards, reloadable fare cards, and receipts are also provided in the change/receipt slot. The TVM 308 may further dispense single-ride fare cards through card dispenser 420, which is coupled with a card storage unit (not shown) storing reloadable prepaid cards for distribution. Information regarding transactions may be communicated through the LAN 302 by the vending machine processor 402 using, for example, a network interface (not shown).

Information regarding transaction may be communicated to various entities. For example, it may be communicated to a central ticketing system to create a transit user account, a card issuer to approve and/or activate a card, or another entity. It will be understood that a card issuer may comprise a financial institution, which may receive communication from the TVM 308 via a financial network, a central ticketing system, and/or WAN 206. Moreover, a prepaid account associated with a reloadable prepaid card may comprise a funding source maintained by a financial institution (which may be the card issuer of the reloadable prepaid card).

A display system 422 prompts the card holder through the refill/purchase process. For example, the screen may prompt the purchaser to touch a start button/icon on a touch screen display of the display system 422 to begin the process. A textual display portion 424 may display textual instructions for the user after the process has begun. Additionally or alternatively, an audio system 426, including a speaker, may produce audio commands. The user may be given a menu of choices of how to proceed. For example, the menu may include choices to purchase a reloadable prepaid card, reload a reloadable prepaid card, purchase a reloadable fare card, reload a reloadable fare card, or purchase a single-ride fare card. It will be understood that, additionally or alternatively to a touch screen display, other input interfaces may be utilized to accept input from a user. This may include, but is not limited to a touchpad, keyboard, mouse, trackball, audio input interface, joystick, etc.

If the user chooses an option requiring payment, the user may be instructed, by menu prompts, pre-recorded video and/or audio, on how to proceed with the payment. The user may be given a choice to pay in cash or by credit/debit card. For cash purchases, the user is instructed to insert coins or bills into the coin slot 412 or the bill loader 414. For credit/debit card purchases, the user is instructed to insert a credit or debit card into the credit/debit card reader 406, or touch an RFID-enabled credit or debit card to contactless card reader 408. If the user chooses to reload a reloadable prepaid card, the user may insert the reloadable prepaid card into reader 406, or touch an RFID-enabled reloadable prepaid card to contactless card reader 408, and proceed with a cash or credit/debit payment.

As may be understood from the foregoing, each instance of a TVM 308 may include a number of components or elements, external or internal, each of which at some point in time may require attention in terms of maintenance, if and when an issue arises for example. It is contemplated that the WARD 320 together with the VAE 210 as shown in at least FIG. 3 may enable personnel to quickly and intuitively ascertain the operational health of a number of instances of a TVM 308, simultaneously in certain scenarios, via augmented reality. However, the features or aspects of the present disclosure advantageously provide a number of levels of information granularity, so that an operator is not overloaded with operational health or status information. Furthermore, it is contemplated that instructions may be displayed to enable the operator to quickly mitigate any issue or problem associated with a particular TVM 308.

Figure 6:
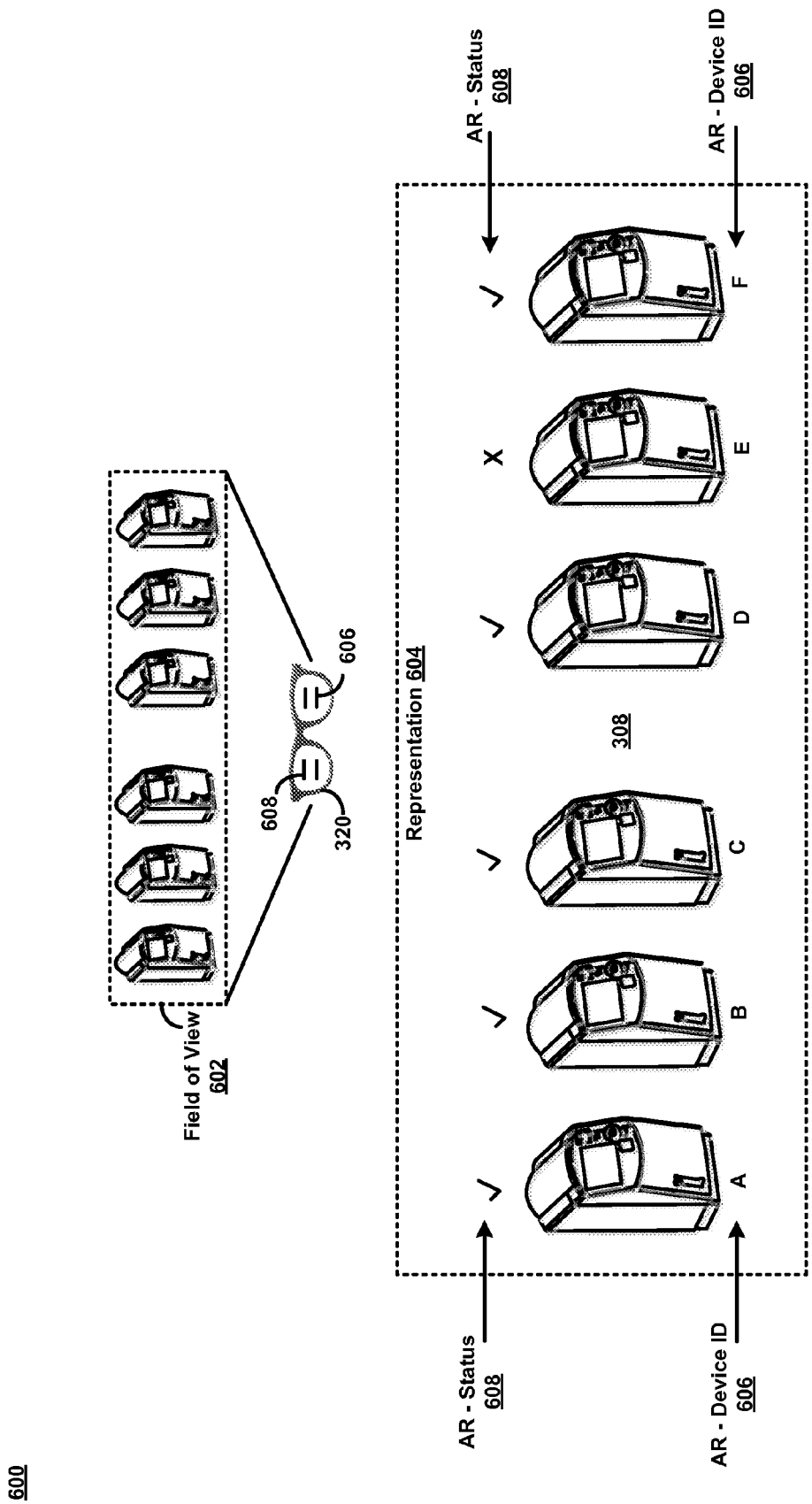
FIG. 6 shows a first example visual assessment of device operational health.

For instance, referring now to FIG. 6, a first example visual assessment of device operational health 600 is shown in accordance with the principles of the present disclosure. In this example, assume that an operator is wearing the WARD 320 and is "looking" at a bank of TVMs 308, so that a total of six (6) TVMs 308 are in a first field-of-view 602, from the perspective of the WARD 320. Here, it is contemplated that the WARD 320 may present or display particular operational health or status information relating to each of the six TVMs 308 based upon a negotiation between the WARD 320 and the VAE 210 of the station server 304 (see also FIG. 3).

More specifically, it is contemplated that an image or video of the TVMs 308 in the first field-of-view 602 may be acquired by the camera 324 of the WARD 320. In some examples, the image or video of the TVMs 308 may be acquired in response to user-actuation of the control 330 of the WARD 320. It is contemplated that the control 330 may comprise of a button or the like, and in the present scenario actuation of the control 330 in a particular sequence such as "Depress-Hold-Release" may activate the camera 324 to acquire an image or video of the TVMs 308 in the first field-of-view 602. Other examples are possible. For example, it is contemplated that the control 330 and the WARD 320 may be configured to support any type of HMI (Human-Machine Interaction). One example of such an implementation may include VIC (Voice Input Control). Still other examples are possible. That image or video may then be transmitted from the WARD 320 to the station server 304 via the transceiver 328 of the WARD 320. The VAE 210 may then command the station server 304 to query the station datastore 316 in order to positively identify each of the six TVMs 308, and also to acquire particular operational health or status information, along with GPS information, relating to each of the six TVMs 308. The VAE 210 may then command the station server 304 to transmit all information as acquired or accessed from the station datastore 316 back to the WARD 320.

Next, the computing system 322 of the WARD 320 may acquire an instant reading from the GPS module 326 of the WARD 320. It is contemplated that the WARD 320 may then derive or estimate the physical distance between the WARD 320 and at least one of the TVMs 308 in the first field-of-view 602 based upon the reading from the GPS module 326 together with GPS information contained within the above-mentioned information transmitted from the station server 304 to the WARD 320. For example, the WARD 320 may determine based upon such GPS data that the WARD 320 itself is about fifteen (15) meters in distance from the bank of TVMs 308 in the first field-of-view 602 as shown in FIG. 6. Here, it is contemplated that the WARD 320 may then present or display particular operational health or status information relating to each of the TVMs 308 in the first field-of-view 602 based upon the estimated or approximated distance between the WARD 320 itself and the bank of TVMs 308.

For instance, a representation 604 shown in FIG. 6 is intended to represent what an operator may "see" while "looking" at the bank of TVMs 308 while wearing the WARD 320 in the example scenario. Here, the operator of course "sees" each one of the TVMs 308 in the first field-of-view 602, since the operator is looking at that equipment or those devices. Since though the operator, and therefore the WARD 320, is about fifteen (15) meters from at least one of the TVMs 308 in the first field-of-view 602, the WARD 320 may determine to only output for display a high-level summary of AR (Augmented Reality) information.

For example, based on the noted distance parameter or criterion, the WARD 320 may determine to output for display a device ID (Identification) indicator 606 together with a high-level status indicator 608 each near or adjacent a particular one of the TVMs 308 in the first field-of-view 602, from the perspective of a lens or the like of the WARD 320 whereby each instance of the device ID indicator 606 together with each instance of the high-level status indicator 608 correspond to computer generated images superimposed on a real-world view, i.e., the bank of TVMs 308 in the first field-of-view 602 as shown in FIG. 6. In this manner, the operator may quickly come to an understanding of the ID and status of those devices or equipment. For example, the operator may determine that device "A" as shown in FIG. 6 is fully operational and without issue or problem based upon an AR "√" rendered or projected onto a lens of the WARD 320 near or adjacent that particular device. As another example, the operator may determine that device "E" as shown in FIG. 6 is with issue or problem based upon an AR "X" near or adjacent that particular device. Advantageously, the operator is not overloaded with information in this scenario and instead is presented with a manageable amount of information, enough of which so as to quickly disregard devices "A-D" and "F" and instead focus on device "E" that which may require immediate attention.

Figure 7:
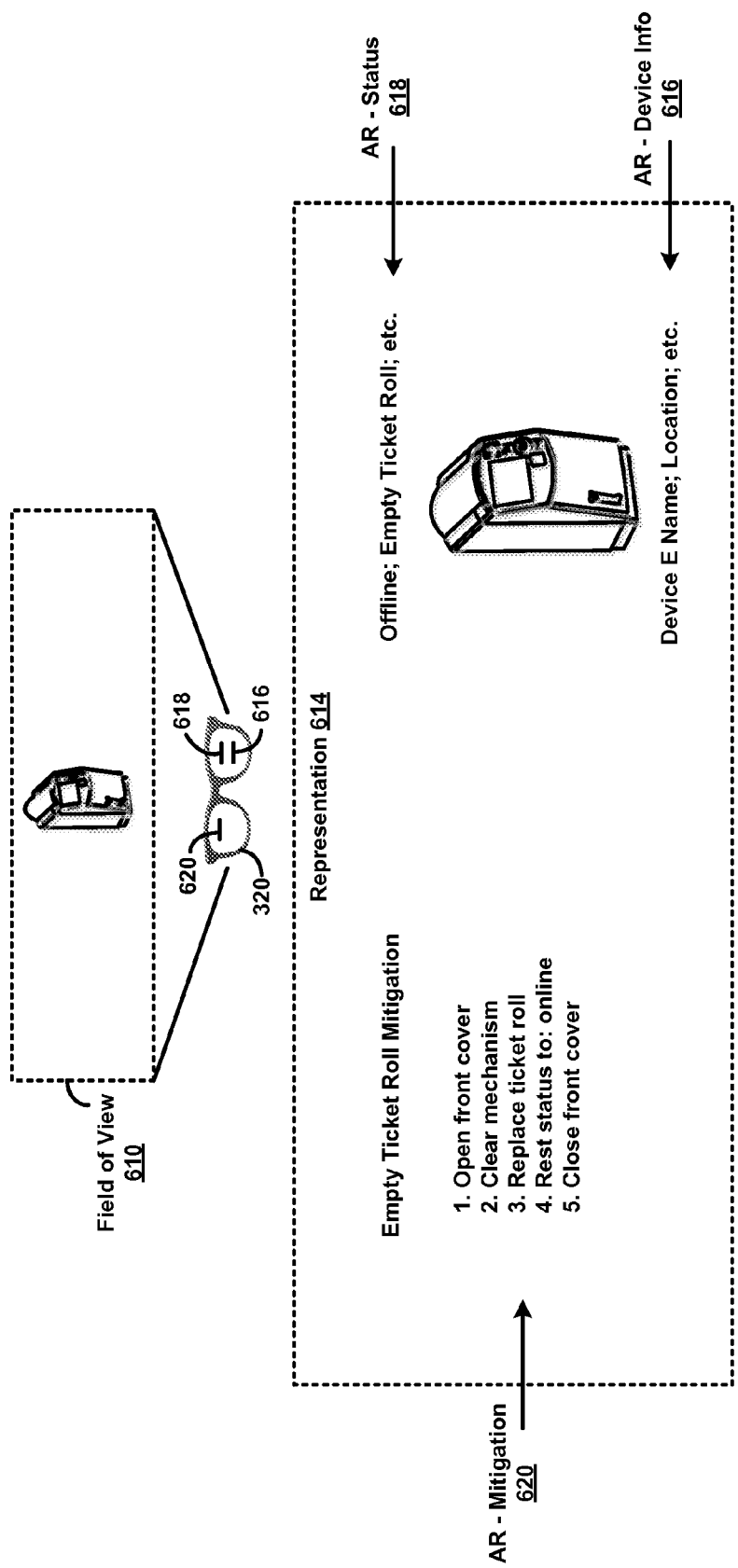
FIG. 7 shows a second example visual assessment of device operational health.

For instance, referring now to FIG. 7, a second example visual assessment of device operational health 700 is shown in accordance with the principles of the present disclosure. In this example, assume the operator has walked over to the above-mentioned/shown device "E" to investigate the status of that device based upon the AR "X" near or adjacent that particular device in the example representation 604. More specifically, assume that the operator is still wearing the WARD 320 and is "looking" at the particular TVM 308 identified as the device "E" in the above-example scenario, so that a total of one (1) TVM 308 is in a second field-of-view 610 from the perspective of the WARD 320. Here, it is contemplated that the WARD 320 may present or display particular operational health or status information relating to that particular TVM 308 based upon the above-mentioned information previously transmitted from the station server 304 to the WARD 320.

For example, it is contemplated that an image or video of the particular TVM 308 in the second field-of-view 610 may be acquired by the camera 324 of the WARD 320. That image or video may then be transmitted from the WARD 320 to the station server 304 via the transceiver 328 of the WARD 320. In some examples, the transmission may be instantiated in response to user-actuation of the control 330 of the WARD 320. It is contemplated that the control 330 may comprise of a button or the like, and in the present scenario actuation of the control 330 in a particular sequence such as "Depress-Hold-Depress-Hold" may instantiate the transmission of the image or video from the WARD 320 to the station server 304 via the transceiver 328. Other examples are possible.

The VAE 210 of the station server 304 may then identify the particular TVM 308 as the device "E" in the above-example scenario based upon a tag 612 (see FIG. 4) in the image or video that is recognizable by the VAE 210, and that distinguishes that particular TVM 308 from all other TVMs in the example station system 202 of FIG. 3. In other examples, the VAE 210 of the station server 304 may then identify the particular TVM 308 as the device "E" in the above-example scenario based upon a landmark 613 in the image or video that is recognizable by the VAE 210, and that may be utilized to distinguish that particular TVM 308 from all other TVMs in the example station system 202 of FIG. 3. Other examples are possible as well.

To minimize data transfer and/or maximize bandwidth, the VAE 210 may determine that no changes in status of the particular TVM 308 identified as the device "E" have occurred since the prior transmission of data from the station server 304 to the WARD 320, and instead may transmit a command to the WARD 320 to query the above-mentioned information stored within a non-transitory storage medium of the WARD 320 (see e.g., element 1010 in FIG. 10), in order to obtain and then present or display particular operational health or status information relating to that particular TVM 308.

For example, the computing system 322 of the WARD 320 may acquire an instant reading from the GPS module 326 of the WARD 320. In some examples, the instant GPS reading may be acquired in response to user-actuation of the control 330 of the WARD 320. It is contemplated that the control 330 may comprise of a button or the like, and in the present scenario actuation of the button in a particular sequence such as "Depress-Hold-Hold-Release" may activate the computing system 322 of the WARD 320 to acquire an instant reading from the GPS module 326 of the WARD 320. Other examples are possible.

The WARD 320 may then determine based upon the newly acquired GPS data, together with GPS data that describes a precise location of the particular TVM 308 identified as the device "E" in the above-example scenario, that the WARD 320 itself is about 0.5 meters in distance from the particular TVM 308 in the second field-of-view 610 as shown in FIG. 7. Here, it is contemplated that the WARD 320 may then present or display particular operational health or status information relating to the particular TVM 308 based upon the estimated or approximated distance between the WARD 320 itself and the particular TVM 308.

For instance, a representation 614 shown in FIG. 7 is intended to represent what an operator may "see" while "looking" at the subject TVM 308 while wearing the WARD 320. Here, the operator of course "sees" the particular TVM 308 in the second field-of-view 610, since the operator is looking at that particular piece of equipment or device. Since though the operator, and therefore the WARD 320, is about 0.5 meters from the TVMs 308 in the second field-of-view 610, the WARD 320 may determine to output for display a detailed-level of AR information. That is, AR information having greater detail than that shown in the example representation 604 of FIG. 6.

For example, based on the 0.5 meters distance parameter or criterion, the WARD 320 may determine to output for display a detailed device ID indicator 616 together with a detailed status indicator 618 near or adjacent the TVM 308 in the second field-of-view 610. In this manner, the operator may quickly come to a more detailed understanding of the ID and status of that particular piece of equipment, when compared to that shown and described above in connection with FIG. 6. For example, based on what the operator "sees" while looking the each lens of the WARD 320, the operator may determine that "Device E Name; Location; etc." is "Offline" due to an "Empty Ticket Roll." Advantageously, the operator is presented with a level of information that may enable the operator to positively identify the issue or problem with that particular device or piece of equipment, and it is further contemplated that the WARD 320 may determine to output for display an issue mitigation list 620 to guide the operator through a process to rectify the "Empty Ticket Roll" issue of the present example. For example, the mitigation list 620 may include a number of steps such as "1. Open front cover; 2. Clear mechanism; 3. Replace ticket role; 4, Reset status to: online; 5. Close front cover." In this example scenario, even an operator who is inexperienced or not versed or familiar with how to fix the "Empty Ticket Roll" issue may be guided through process by virtue of the mitigation list 620. Other examples are possible.

In some examples, the mitigation list 620 may be output for display by the WARD 320 in response to user-actuation of the control 330 of the WARD 320. It is contemplated that the control 330 may comprise of a button or the like, and in the present scenario actuation of the button in a particular sequence such as "Depress-Depress-Hold-Depress-Depress-Hold" may activate the computing system 322 of the WARD 320 to output for display the mitigation list 620. Other examples are possible. For instance, it is contemplated that the features or aspects of the present disclosure may be implemented continuously, and in substantially real-time, i.e., on the order of machine clock cycles, without requiring explicit user-input. For example, it is contemplated that the WARD 320 and the station server 304 may be in continuous communication, and a negotiation between the WARD 320 and the station server 304 comprising the continuous transfer of data therebetween may permit the features or aspects of the present disclosure.

For example, at the start of a "shift," an operator may don and turn "on" the WARD 320. In response, the computing device 322 of the WARD 320 may activate at least one of the camera 324, GPS module 326, transceiver 328, and control 330 of the WARD 320. In this example, the WARD 320 may be personalized or customized in the sense that once the WARD 320 is activated, the WARD 320 may negotiate with the station server 304 and download current or up-to-date information associated with each and every TVM 308 within the station system 202, because the primary job function of the operator may be to maintain TVMs 308 within or at the station system 202.

Next, assume the operator begins "rounds" by walking around the station system 202 and observing particular TVMs 308 within the station system 202. Once a TVM(s) 308 is determined by the WARD 320 to be within the field of view of the WARD 320, the WARD 320 itself or in tandem with the station system 202, based upon a communication sequence or handshake between the two elements, may identify any TVM(s) 308 within the field of view of the WARD 320 and instantly output for display particular AR information or data for viewing. In some examples, the particular AR information may be a function of the distance between the TVM(s) 308 within the field of view of the WARD 320. Further, if there are a number of TVM(s) 308 within the field of view of the WARD 320 determined to be at different distances from the WARD 320, such as a particular TVM 308 being one (1) meter in distance from the WARD 320 and another particular TVM 308 being five (5) meters in distance from the WARD 320, the WARD 320 may default to the display of particular AR information in a manner as shown in FIG. 6. Additionally, a hybrid scenario is contemplated whereby the WARD 320 may output for display particular AR information in a manner as shown in FIG. 6 together particular AR information in a manner as shown in FIG. 7. In either case, it is contemplated that the operator may roam freely throughout the station system 202 and observe the status of TVMs 308 essentially hands-free and in real-time, since one intent of the features or aspects of the present disclosure is to enable an operator come to a swift understanding of the status of TVMs 308 throughout the station system 202, for example, simply by "looking" at the TVMs 308.

Figure 8:
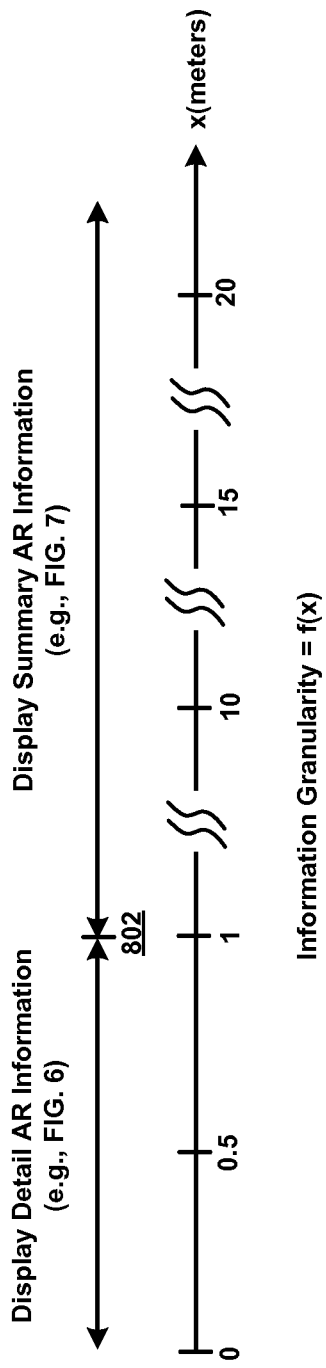
FIG. 8 shows an example information granularity scheme according to the disclosure.

Referring now to FIG. 8, an example information granularity scheme 800 is shown in accordance with the principles of the present disclosure. In this example, the abscissa or x-axis represents an approximate distance between the WARD 320 and the particular TVM 308 identified as the device "E" in the above-example scenarios of FIG. 6 and FIG. 7. Although the present disclosure is not so limited, a single threshold 802 is shown whereby when it is determined by the WARD 320 that an approximate distance between the WARD 320 and the particular TVM 308 identified as the device "E" in the above-example scenarios is greater than one (1) meter, or greater than or equal to one (1) meter, then only summary AR information is output for display by the WARD 320 in a manner as shown and described in connection with FIG. 6. However, when it is determined by the WARD 320 that the approximate distance between the WARD 320 and the particular TVM 308 identified as the device "E" in the above-example scenarios is less than one (1) meter, or less than or equal to one (1) meter, then detailed AR information is output for display by the WARD 320 in a manner as shown and described in connection with FIG. 7. It is though contemplated that a granularity scheme may be defined to include more than one threshold.

For example, a two (2) threshold scheme is contemplated where, for example, when it is determined by the WARD 320 that an approximate distance between the WARD 320 and the particular TVM 308 identified as the device "E" in the above-example scenarios is greater than (or equal to) ten (10) meters, then only summary AR information is output for display by the WARD e 320 in a manner as shown and described in connection with FIG. 6. Further, when it is determined by the WARD 320 that an approximate distance between the WARD 320 and the particular TVM 308 identified as the device "E" in the above-example scenarios is less than or equal to (or just less than) one (1) meter, then detailed AR information is output for display by the WARD 320 in a manner as shown and described in connection with FIG. 7. Further, when it is determined by the WARD 320 that the approximate distance between the WARD 320 and the particular TVM 308 identified as the device "E" in the above-example scenarios is greater than (or equal to) one (1) meter, but less than or equal to (or just less than) ten (10) meters, then an intermediate amount of detailed AR information may be output for display by the WARD 320. For example, when physically located in the noted middle distance range, the WARD 320 may be programmed to output the AR status 608 as shown in FIG. 6 and the AR device information 616 as shown in FIG. 7. Other examples are possible.

Figure 9:
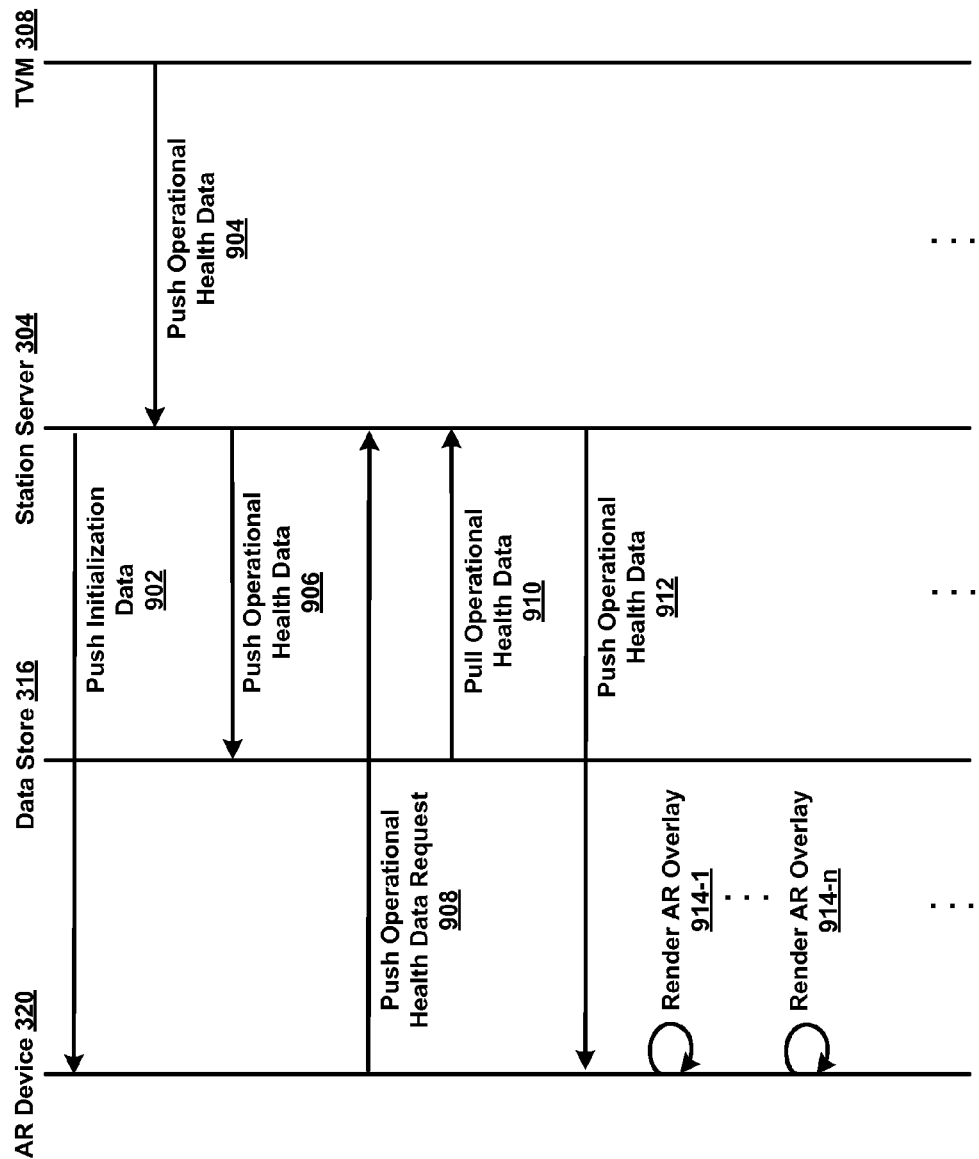
FIG. 9 shows an example swim diagram according to the disclosure.

Referring now to FIG. 9, an example swim diagram 900 is shown in accordance with the principles of the present disclosure. In particular, the swim diagram 900 shows an example communication sequence between a number of elements or components of the example station system 202 described above in connection with at least FIG. 3. In this example, the station server 304 at 902 may push initialization data to the WARD 320 for storage thereby in a non-transitory medium. It is contemplated that the initialization data may be operator-specific. For example, the station server 304 may push GPS data and/or tag data that identifies each of a plurality of TVMs 308 as well as position or placement of the same within or at the station system 202. Such an implementation may be beneficial in the situation wherein the primary job function of the operator is to maintain each of the plurality of TVMs 308 within the particular transit station. It is contemplated that the station server 304 may transmit or send other data to the WARD 320 as well. For example, the station server 304 may push information related to the particular operator, such as permissions, login tokens, etc., on the basis that the WARD 320 may be shared with other operators, such as between an operator that works the day shift and an operator that works the night shift. Similarly, the station server 304 may push previously defined or recorded configuration settings for the particular operator, such as preferences for color use, brightness, audio, mode setting, and etc.

Additionally, the TVM 308 may at 904 push operational health data of the TVM 308 itself to the station server 304. It is contemplated that the TVM 308 may push operational health data of the TVM 308 to the station server 304 as part of a periodic process. Additionally, it is contemplated that the TVM 308 may push operational health data of the TVM 308 to the station server 304 in response to a "one-off" command instantiated by an operator or employee associated with the WARD 320, or by an operator or employee located in centralized service or data center. In either case, such an implementation may be beneficial in that the station server 304 may always have access to up-to-date operational health information of the TVM 308. It is contemplated that the TVM 308 may transmit or send other data to the station server 304 as well. For example, the TVM 308 may push operational data such as number of tickets sold, average queuing time, etc., that which may enable a staff member to get a quick feel for with respect to how the services of the TVM 308 are being utilized.

Additionally, the station server 304 may at 906 push operational health data of the TVM 308 to the station datastore 316 for storage thereby in a historical log associated with the TVM 308. It is contemplated that the station server 304 may push operational health data of the TVM 308 to the station datastore 316 as part of the above-mentioned periodic process, or in response to any scenario by which the TVM 308 is activated to report operational health status to the station server 304. Such an implementation may be beneficial as the station datastore 316 may serve as a central repository of operational health status information for each and every device or equipment of the example station system 202 described above in connection with at least FIG. 3. Additionally, it is contemplated that the station server 304 may access the station datastore 316 and aggregate the data to give or provide an understanding of equipment estate availability such as percent (e.g., 50%) of total available, current cash levels on station, total number of tickets sold in the last hour, and etc. Advantageously, such informative data when surfaced to an operator for example may function as a cue as to the presence of a potential operational issue(s).

Additionally, the WARD 320 may at 908 push to the station server 304 a request for operational health data of the TVM 308. It is contemplated the request may include an image or video of the TVM 308, and/or an image or video of a tag or the like associated with the TVM 308, to enable the station server 304 to positively identify the TVM 308. Such an implementation may be beneficial as the task of identifying the TVM 308 is shifted to the station server 304 to reduce or minimize the amount of processing required to be performed by the WARD 320, thus saving on battery life of the WARD 320. It is contemplated the WARD 320 may transmit or send other data to the station server 304 as well. For example, the WARD 320 at 908 may transmit configuration and/or preference information, which may enable the operator to selectively request data, or potentially request more comprehensive data than may normally be pushed to the WARD 320 (see e.g., 912).

Additionally, the station server 304 may at 910 pull operational health data of the TVM 308 following positive identification of the same, and then at 912 push operational health data of the TVM 308 to the WARD 320. It is contemplated that the station server 304 may only push updates in operational health data of the TVM 308 to the WARD 320; otherwise the station server 304 may push 912 a small amount of data to the WARD 320 that indicates "no-change" in status. Such an implementation may be beneficial in that bandwidth may be conserved when there is "no-change" in status of the TVM 308, as compared to prior operational health data of the TVM 308 pushed to the WARD 320. Rather, the WARD 320 may only need to access the prior operational health data of the TVM 308 pushed to the WARD 320. It is contemplated the station server 304 pull and then push other data to the WARD 320 as well. For example, the station server 304 pull and then push broader status updates for the station system 202, rather than only TVM operational health data.

Additionally, the WARD 320 may at 914 render in particular detail AR information associated with the operational health of the TVM 308. It is contemplated that the AR information associated with the operational health of the TVM 308 may be rendered as a high-level summary, or in greater detail when compared to the high-level summary, in a manner as described above in connection with FIGS. 6-8. Such an implementation may be beneficial in that the operator is supplied with germane information while not being overloaded with information.

As discussed above, the present disclosure is directed to or towards systems and methods that enable personnel to quickly and intuitively determine the operational health of particular equipment or devices, and such an implementation may be beneficial and/or advantageous in many respects. For example, and continuing with the example implementation-specific scenario, one of the main advantages is associated with productivity of staff as there is no need to refer to secondary equipment, or potentially wander off to check on each TVM manually. By augmenting the standard view of the station then the staff member is automatically prompted and effectively guided to where the problems are. Staff members don't need to necessarily know the station layout, and therefore don't need to be tied to a station, to understand where the TVMs are physically located. By minimizing the associated investment and productivity for the staff it may be possible for the staff to support more equipment/stations.

Accordingly, it is contemplated that a method may include or comprise sending, by an AR (Augmented Reality) device to a transit system server, a request for access to operational health data associated with at least one device of the transit system. In general, the request for access may be part of communication sequence or negotiation between the AR and the transit system server to enable an operator to observe or glance around an environment and in an intuitive manner quickly come to an understanding of the operational health or status of the at least one device of the transit system. The method may further include or comprise receiving, by the AR device from the transit system server, operational health data associated with the at least one device of the transit system. In general, the operational health data associated with the at least one device of the transit system is diagnostic-related and may refer to the instant overall status of the at least one device of the transit system, such as "offline" or "online" for example, and/or the instant status of at least one particular component of the at least one device of the transit system, such as a particular component of the at least one device of the transit system that is "jammed" or "operational" for example.

Additionally, the received operational health data associated with the at least one device of the transit system may include or comprise a plurality of detail that describes operational health of the at least one device of the transit system, along with the at least one device of the transit system itself, such as a device ID and/or GPS data that describes a location of the at least one device at the transit system. The method may further include or comprise outputting, by the AR device for display thereby, operational health data associated with the at least one device of the transit system in a detail that is a function of a distance between the AR device and the least one device of the transit system. As mentioned, the received operational health data associated with the at least one device of the transit system may include or comprise a plurality of detail that describes operational health of the at least one device of the transit system, along with the at least one device of the transit system itself. In this example, operational health data associated with the at least one device of the transit system may be output for display in a first detail when the at least one device is determined to be greater than a predetermined and user-configurable threshold distance from an instant location of the AR device, and may be output for display in a second detail that is greater than the first detail when the at least one device is determined to be less than or equal to the predetermined and user-configurable threshold distance from an instant location of the AR device. Accordingly, the features of aspects of the present disclosure may provide a number of levels of information granularity, so that an operator is not overloaded with operational health or status information.

The method may include or comprise determining the distance between the AR device and the least one device based upon readings of a GPS (Global Positioning System) component of the AR device and GPS data that describes a location of the least one device at the transit system. In this example, the AR device may leverage GPS to determine an instant location of the AR device with respect to the at least one device at the transit system, and by extension the distance between the AR device the at least one device at the transit system. Other implementations are however possible.

For example, the method may include or comprise determining the distance between the AR device and the least one device based upon an analysis of a dimension or size of the least one device within a particular image. In this example, the AR device may capture at least one image or video of the least one device. In a particular image, the AR device may "appear" for example to exhibit the relative dimension of two (2) centimeters height. It is contemplated that the AR device may query a table that comprises a plurality of scale or scaling data each one of which may be used to estimate the distance between the AR device and the least one device based upon an input. For example, an input of two (2) centimeters height may translate into a distance of 10 meters. In contrast, an input of one (1) centimeters height may translate into a distance of 15 meters. Accordingly, it is contemplated that the relative "size" of the least one device in an image may be leveraged to estimate the distance between the AR device and the least one device. It will be appreciated that when the least one device appears to be of "greater" size or dimension in a first particular image acquired by the AR device when compared to a second particular image acquired by the AR device that the AR device was physically "closer" to the least one device at a time of acquisition of the first particular image.

Figure 10:
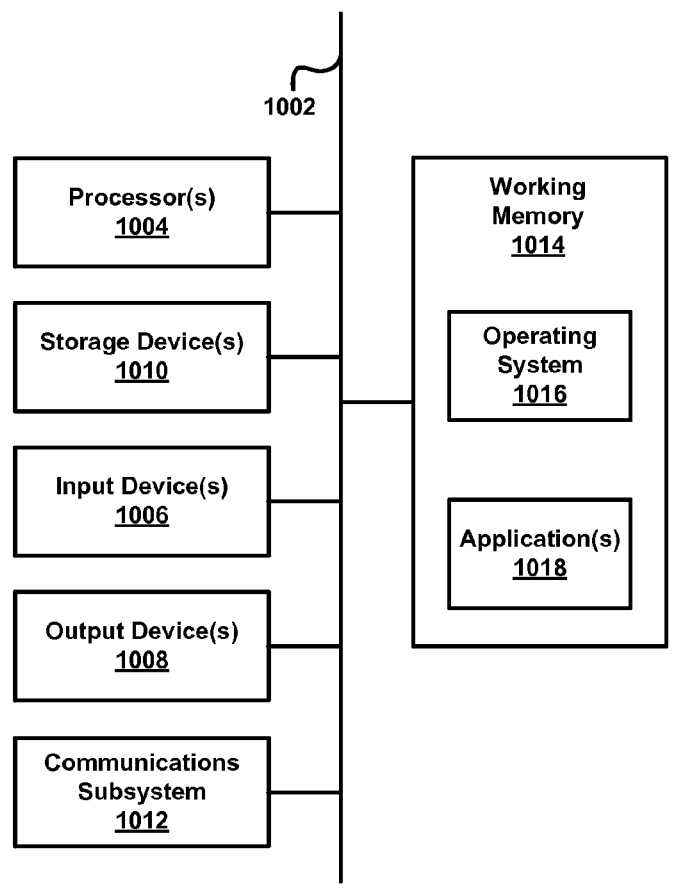
FIG. 10 shows an example computing system or device according to the disclosure.

FIG. 10 shows an example computer system or device 1000 in accordance with the principles of the present disclosure. An example of a computer system or device includes an enterprise server, blade server, desktop computer, laptop computer, tablet computer, personal data assistant, smartphone, a wearable augmented reality device, a ticket booth computer, an access control point, a ticket vending machine, and/or any other type of computing system or device. The computer system 1000 may be wholly or at least partially incorporated as part of any of the previously-described computing devices or equipment, as shown and discussed above in connection with FIGS. 1-9. Further, the computer device 1000 may be configured to perform and/or include instructions that, when executed, cause the computer system 1000 to perform particular steps of the method of at least one of FIG. 1 and FIG. 9.

The computer device 1000 is shown comprising hardware elements that may be electrically coupled via a bus 1002 (or may otherwise be in communication, as appropriate). The hardware elements may include a processing unit with one or more processors 1004, including without limitation one or more general-purpose processors and/or one or more special-purpose processors (such as digital signal processing chips, graphics acceleration processors, and/or the like); one or more input devices 1006, which may include without limitation a remote control, a mouse, a keyboard, and/or the like; and one or more output devices 1008, which may include without limitation a presentation device (e.g., television), a printer, and/or the like.

The computer system 1000 may further include (and/or be in communication with) one or more non-transitory storage devices 1010, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 1000 might also include a communications subsystem 1012, which may include without limitation a modem, a network card (wireless or wired), an infrared communication device, a wireless communication device, and/or a chipset such as a Bluetooth™ device, an 1002.11 device, a WiFi device, a WiMax device, cellular communication facilities (e.g., GSM, WCDMA, LTE, etc.), and/or the like. The communications subsystem 1012 may permit data to be exchanged with a network, other computer systems, and/or any other devices described herein. In many examples, the computer system 1000 will further comprise a working memory 1014, which may include a random access memory and/or a read-only memory device, as described above.

The computer device 1000 also may comprise software elements, shown as being currently located within the working memory 1014, including an operating system 1016, device drivers, executable libraries, and/or other code, such as one or more application programs 1018, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described systems and methods.

A set of these instructions and/or code might be stored on a non-transitory computer-readable storage medium, such as the storage device(s) 1010 described above. In some cases, the storage medium might be incorporated within a computer system, such as computer system 1000. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 1000) to perform methods in accordance with various examples of the invention. According to a set of examples, some or all of the procedures of such methods are performed by the computer system 1000 in response to processor 1004 executing one or more sequences of one or more instructions (which might be incorporated into the operating system 1016 and/or other code, such as an application program 1018) contained in the working memory 1014. Such instructions may be read into the working memory 1014 from another computer-readable medium, such as one or more of the storage device(s) 1010. Merely by way of example, execution of the sequences of instructions contained in the working memory 1014 may cause the processor(s) 1004 to perform one or more procedures of the methods described herein.

The terms machine-readable medium (media) and computer-readable medium (media), as used herein, may refer to any medium that participates in providing data that causes a machine to operate in a specific fashion. In an example implemented using the computer device 1000, various computer-readable media might be involved in providing instructions/code to processor(s) 1004 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1010. Volatile media may include, without limitation, dynamic memory, such as the working memory 1014.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer may read instructions and/or code.

Various forms of computer-readable media may be involved in carrying one or more sequences of one or more instructions to the processor(s) 1004 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1012 (and/or components thereof) generally will receive signals, and the bus 1002 then might carry the signals (and/or the data, instructions, etc. carried by the signals) to the working memory 1014, from which the processor(s) 1004 retrieves and executes the instructions. The instructions received by the working memory 1014 may optionally be stored on a non-transitory storage device 1010 either before or after execution by the processor(s) 1004.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   sending at a first time, by an AR (Augmented Reality) device to a transit system server, a request for access to operational health data associated with at least one device of the transit system;
   receiving, by the AR device from the transit system server, operational health data associated with the at least one device of the transit system;
   outputting, by the AR device for display thereby, operational health data associated with the at least one device of the transit system in a detail that is a function of a distance between the AR device and the least one device of the transit system;
   storing the operational health data on a memory of the AR device;
   sending at a second time, by the AR device to the transit system server, a request for access to operational health data associated with the at least one device of the transit system;
   receiving, by the AR device from the transit system server, an indication that there is no change in status of the operational health data;
   retrieving, by the AR device, the stored operational health data; and
   outputting, by the AR device for display thereby, the stored operational health data.

2. The method of claim 1, further comprising:
   determining the distance between the AR device and the least one device based upon readings of a GPS (Global Positioning System) component of the AR device and GPS data that describes a location of the least one device at the transit system.

3. The method of claim 1, further comprising:
   determining the distance between the AR device and the least one device based upon an analysis of a dimension or size of the least one device within a particular image.

4. The method of claim 1, further comprising:
   determining that the distance between the AR device and the least one device is greater than or equal to a predetermined threshold distance; and
   rendering operational health data associated with the at least one device as an abbreviated summary to convey a high-level operational status of the least one device.

5. The method of claim 1, further comprising:
   determining that the distance between the AR device and the least one device is less than or equal to a predetermined threshold distance; and
   rendering operational health data associated with the at least one device as an unabbreviated summary to convey a detailed operational status of the least one device.

6. The method of claim 1, further comprising:
   determining that the distance between the AR device and the least one device is less than or equal to a predetermined threshold distance;
   rendering operational health data associated with the at least one device as an unabbreviated summary to convey a detailed operational status of the least one device; and
   rendering instructions for maintenance of at least one component of the at least one device.

7. The method of claim 1, further comprising:
   sending as part of the request for access to operational health image data for use by the transit system server to uniquely identify the at least one device.

8. The method of claim 1, further comprising:
   sending the request for access to operational health data associated with at least one device in response to a user-input detected by the AR device.

9. The method of claim 1, further comprising:
   rendering the operational health data associated with the at least one device in response to a user-input detected by the AR device.

10. The method of claim 1, wherein the AR device comprises a wearable OHMD (Optical Head-Mounted Display).

11. The method of claim 1, wherein the at least one device is selected from a ticket vending machine, an access control point, and a ticket booth computer of the transit system.

12. A server system, comprising:
    at least one processor;
    at least one wireless network interface; and
    at least one non-transitory memory element communicatively coupled with and readable by the at least one processor, and having stored therein processor-readable instructions that when executed by the at least one processor cause the at least one processor to:
      detect a request for access to operational health data associated with at least one computing device;
      access a database to acquire operational health data associated with the at least one computing device; and
      generate a command to transmit via the at least one wireless network interface the operational health data associated with the at least one computing device to an AR (Augmented Reality) device for display thereby in a detail that is a function of a distance between the AR device and the least one computing device
    storing the operational health data on a memory of the AR device;

sending at a second time, by the AR device to the transit system server, a request for access to operational health data associated with the at least one device of the transit system;

receiving, by the AR device from the transit system server, an indication that there is no change in status of the operational health data;

retrieving, by the AR device, the stored operational health data;

outputting, by the AR device for display thereby, the stored operational health data.

13. The server system of claim 12, wherein the processor-readable instructions when executed by the at least one processor cause the at least one processor to:

identify the at least one computing device based upon a marker or a code within an image of the at least one computing device.

14. The server system of claim 12, wherein the processor-readable instructions when executed by the at least one processor cause the at least one processor to:

identify the at least one computing device based upon a dimension or size of the at least one device within an image of the at least one computing device.

15. The server system of claim 12, wherein the processor-readable instructions when executed by the at least one processor cause the at least one processor to:

generate a command to transmit via the at least one wireless network interface data associated with instructions for maintaining the at least one computing device.

16. The server system of claim 12, wherein the processor-readable instructions when executed by the at least one processor cause the at least one processor to:

generate a command to transmit via the at least one wireless network interface GPS (Global Positioning System) data associated with the least one computing device.

17. The server system of claim 12, wherein the processor-readable instructions when executed by the at least one processor cause the at least one processor to:

generate a command to transmit via the at least one wireless network interface data associated user-specific settings for the AR device and data associated with a transit system and at least one device of the transit system for display by the AR device.

18. The server system of claim 12, wherein the processor-readable instructions when executed by the at least one processor cause the at least one processor to:

store to the database operational health data associated with the at least one computing device.

19. The server system of claim 12, wherein the processor-readable instructions when executed by the at least one processor cause the at least one processor to:

establish a communication link between the server system and the AR device.

20. A method, comprising:

sending at a first time, by a wearable AR (Augmented Reality) device to a server, a request for access to operational health data associated with a ticket vending machine of a transit system;

receiving, by the AR device from the server, operational health data associated with the ticket vending machine; and rendering, by the AR device in response to a command, operational health data associated with the ticket vending machine in a detail that is a function of a distance between the AR device and the ticket vending machine;

storing the operational health data on a memory of the AR device;

sending at a second time, by the AR device to the transit system server, a request for access to operational health data associated with the at least one device of the transit system;

receiving, by the AR device from the transit system server, an indication that there is no change in status of the operational health data;

retrieving, by the AR device, the stored operational health data;

outputting, by the AR device for display thereby, the stored operational health data;

wherein the operational health data associated with the ticket vending machine is rendered as an abbreviated summary to convey high-level operational status of the ticket vending machine when the distance between the AR device and the ticket vending machine is greater than a threshold distance, and wherein the operational health data associated with the ticket vending machine is rendered as an unabbreviated summary to convey in greater detail than the abbreviated summary operational status of ticket vending machine when the distance between the AR device and the ticket vending machine is less than or equal to the threshold distance.

* * * * *